(12) United States Patent
Clauss et al.

(10) Patent No.: US 7,358,746 B2
(45) Date of Patent: Apr. 15, 2008

(54) METHOD AND MEASURING APPLIANCE FOR LOCATING ENCLOSED OBJECTS

(75) Inventors: Stefan Clauss, Leinfelden-Echterdingen (DE); Uwe Skultety-Betz, Leinfelden-Echterdingen (DE); Bjoern Haase, Stuttgart (DE); Ulli Hoffmann, Nieffern-Oeschelbronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/500,589

(22) PCT Filed: Feb. 6, 2003

(86) PCT No.: PCT/DE03/00340

§ 371 (c)(1),
(2), (4) Date: Jun. 30, 2004

(87) PCT Pub. No.: WO03/073131

PCT Pub. Date: Sep. 4, 2003

(65) Prior Publication Data

US 2005/0040817 A1    Feb. 24, 2005

(30) Foreign Application Priority Data

Feb. 21, 2002   (DE)   ................. 102 07 425

(51) Int. Cl.
*G01R 27/26* (2006.01)

(52) U.S. Cl. .................. 324/663; 324/662; 324/67

(58) Field of Classification Search .......... 324/662, 324/663, 665, 671, 672, 67
See application file for complete search history.

(56) References Cited

U.S. PATENT DOCUMENTS

| | | | |
|---|---|---|---|
| 4,814,690 A | 3/1989 | Melcher | 324/67 |
| 6,198,271 B1 | 3/2001 | Dodd et al. | 324/67 |
| 6,249,113 B1 | 6/2001 | Kook | 324/67 |
| 6,380,747 B1 * | 4/2002 | Goldfine et al. | 324/457 |
| 6,593,754 B1 * | 7/2003 | Steber et al. | 324/671 |
| 6,781,387 B2 * | 8/2004 | Goldfine et al. | 324/658 |
| 2001/0024126 A1 * | 9/2001 | Sporl et al. | 324/685 |

FOREIGN PATENT DOCUMENTS

| | | |
|---|---|---|
| WO | 94/04932 | 3/1994 |
| WO | 98 30921 A | 7/1998 |

* cited by examiner

*Primary Examiner*—Andrew H. Hirshfeld
*Assistant Examiner*—John Zhu
(74) *Attorney, Agent, or Firm*—Michael J. Striker

(57) ABSTRACT

In a method for locating objects enclosed in a medium, a detection signal is generated by at least one capacitive sensor. The detection signal penetrates the medium that is to be analyzed in such a way that information is obtained about the objects that are enclosed in the medium by evaluating the detection signal, particularly by measuring impedance. In order to evaluate the detection signal, an algorithm is used that separates the measured signal into signal parts originating from the enclosing medium and signal parts originating from the object enclosed in the medium. A measuring device carries out the inventive method.

24 Claims, 5 Drawing Sheets

METHOD AND MEASURING APPLIANCE FOR LOCATING ENCLOSED OBJECTS

CROSS-REFERENCE TO RELATED APPLICATIONS

Patent application Ser. Nos. 10/491,087 and 10/492,441 contain a similar subject matter.

BACKGROUND INFORMATION

The present invention relates to a method and/or a measuring device for locating objects enclosed in a medium.

A method of this nature, and/or a measuring device for carrying out this method utilizes a capacitive sensor device that generates a detection signal, e.g., in the form of an electromagnetic field, so that the detection signal passes through the medium to be analyzed, but, at the very least, penetrates the medium to a sufficient extent. An object enclosed in the medium influences the detection signal, so that an evaluation of the detection signal makes it possible to obtain information about an object that is enclosed in the medium.

A measuring device according to the general class, e.g., a stud sensor, detects an object that is enclosed in the medium by way of the change of the electrical capacitance of its capacitive sensor device, the change being generated by the enclosed object. An object that is enclosed in a medium changes the dielectric properties of the medium, so that a precision capacitor that is brought into the vicinity of the object senses a change in capacitance caused by the object and/or a change in its impedance. This capacitance change may be measured, for example, by the shift current of the precision capacitor of the capacitive sensor device.

A compact, hand-held stud sensor is made known in U.S. Pat. No. 6,249,113 B1. To locate objects behind a surface, the stud sensor measures the change in capacitance sensed by a sensor circuitry as the measuring device is moved across a wall. To display the exact location of an object enclosed in the medium, the measuring device according to U.S. Pat. No. 6,249,113 B1 comprises an LED array in an arrow-shaped format on the housing of the measuring device. When an object is detected by the measuring device, a pair of LEDs in the arrow-shaped LED array on the housing of the measuring device is activated as a function of the signal strength. As the sensor is scanned closer to the enclosed object, i.e., the stronger the detection signal that is generated by the object becomes, the further the activated LEDs travel toward the arrow tip in the LED array. When the measuring device is finally positioned directly over the enclosed object, the tip of the arrow in the LED array is illuminated. Basically, therefore, the measuring device according to U.S. Pat. No. 6,249,113 B1 makes it possible to locate objects enclosed in a medium, e.g., a wall. Neither the device disclosed in U.S. Pat. No. 6,249,113 B1 for locating objects enclosed in a medium, nor the very simple method on which it is based, are capable of measuring the depth at which the object is located.

Publication WO 94/04932 discloses a portable device for locating objects positioned behind a surface, comprising a sensor for sensing additional capacitive loading caused by the object, an evaluation unit for the detection signal, and a display for presenting the measured results. In addition, the measuring device according to WO 94/04932 comprises a device that allows the sensor device to be operated in a higher-sensitivity or lower-sensitivity mode.

Publication WO 94/04932 further discloses a method for determining the location of an object positioned behind a surface. To accomplish this, the corresponding measuring device is moved across the wall to be analyzed. The sensor according to WO 94/04932 is capable of sensing an increase or decrease in the thickness of the material. This permits the device to inform the operator, for example, that the sensor was calibrated incorrectly, e.g., directly over an enclosed object. The method on which this is based further makes it possible to inform the operator that the medium being analyzed is too thick or too thin for an enclosed object to be detected.

A digital register in the measuring device according to WO 94/04932 permits the calibration data to be stored indefinitely while the sensor is powered on.

A stud sensor is made known in U.S. Pat. No. 6,198,271 B1, which, in order to locate objects enclosed in a wall, detects the changes in capacitance of three capacitive sensors as the sensor is moved across the wall, the sensors being integrated in the measuring device. A comparison circuit monitors the relative charge time associated with each capacitive element, the charge times providing an indication of the relative capacitances of the three capacitive elements. Changes in the relative capacitances of the three elements as the device is moved along a wall are due to a change in the dielectric constant of the wall, which normally results from the presence of an object behind the surface over which the device is moved. The comparison circuit uses differences in the measured relative capacitances of the individual capacitive elements to locate the enclosed object.

The measuring device disclosed in U.S. Pat. No. 6,198,271 B1 includes a display that consists of a plurality of display elements that are connected with the evaluation unit of the measuring device in such a manner that only those elements that are located directly above the located object display a signal. In this manner, it is possible to center the measuring device over the located object and thereby indirectly determine the location of the object.

SUMMARY OF THE INVENTION

The inventive method for locating objects enclosed in a medium utilizes a detection signal that is generated by a capacitive sensor device, e.g., an electrical field that engages in the medium to be analyzed. The object enclosed in the medium influences the electrical field between the electrodes of the capacitive sensor device and thereby changes the capacitance of the precision capacitor, so that the change in capacitance caused by an enclosed object can be determined, e.g., via determination of a measurement parameter correlated with this shift current. A more exact analysis of this change in capacitance then permits extraction of information about the position of the enclosed object relative to the measuring sensor.

The technical problem that substantially determines the accuracy of detection arises from the fact that the change in capacitance of the precision capacitor caused by the dielectric, enclosed objects is extremely small. Highly accurate precision measurements are therefore indispensible for determining the change in capacitance of the precision capacitor. Changes in capacitance to be determined typically take place in the sub-picofarad range when enclosed dielectric objects, such as plastic pipes, are present.

When an alternating current of one volt is applied to the electrodes of the precision capacitor and the utilized measuring frequency of the measured signal is 100 KHz, these small changes in the capacitor capacitance result in current differences in the shift current of less than 1 microampere. Small current differences of this nature are difficult to measure, in particular, because they are superposed on a background current that is generated by the enclosing medium, independently of the presence of absence of the enclosed object.

According to the invention, the proposed method for locating objects enclosed in a medium provides that, to evaluate the detection signal, the measured signal is separated into signal parts originating from the enclosing medium and signal parts originating from the object enclosed in the medium. By measuring the measurement parameter, which is proportional to the change in capacitance of the precision capacitor in terms of magnitude and phase, it is possible to discriminate signal parts that come from regions of the enclosing medium that are close to the surface, and signal parts that originate from the enclosed object.

The background current is dominated by shift currents that flow through the electrical flux lines close to the surface in the direct vicinity of the capacitor surfaces. These are current components, therefore, that undergo only a slight phase displacement. Due to their characteristic phase position, signal parts from the background can therefore be distinguished from those from the enclosed object, according to the invention.

In advantageous fashion, in order to discriminate the signal parts in the measured signal that originate from the enclosing medium, a mathematical model for the enclosing medium is used that has a plurality of parameters (number "n") which represent different materials. These material parameters are stored in the form of a program map in the measuring device and are capable of being queried for evaluation of the measured signal.

In advantageous fashion, the material parameters for the model of the enclosing medium are obtained by performing reference measurements at defined impedences, so that, before a measurement is carried out, the inventive method already "knows" what the background signal from some typical materials and/or any combination of these materials would look like. By comparing the currently measured signal of the enclosing medium, it is therefore possible with the inventive method to very exactly deduce the composition of the enclosing material and, therefore, its dieletric properties, e.g., its dielectric constants.

The reference measurements at defined impedances can be carried out on known materials, e.g., immediately after production of an inventive measuring device for carrying out the method, and stored in the device.

Advantageously, the inventive measuring device also includes an activatable calibration device with which a reference measurement can be carried out at a defined impedance at any time. A short-circuit loop of the capacitive sensor device can also be utilized as the defined impedance of the calibration device of the measuring device, so that the detection signal is short-circuited and the impedance of the measuring circuit is determined only by the impedance of the wave impedance of the network.

In addition, an "open end", for example, of the detection network can be used to generate a defined impedance. Using switching means internal to the device, the detection signal can be switched over to a corresponding switching circuit for measuring the reference impedance.

To determine the material of the enclosing medium, the inventive method carries out an interpolation between the material value measured for the enclosing medium and the n parameters of the model for the enclosing medium that were obtained in the reference measurements. Using a reference optimization, a very good approximation of the dielectric properties of the enclosing medium can be determined in this manner.

Advantageously, at least four reference values of materials for determining the enclosing medium are measured and stored in the inventive measuring device. Based on the four known dielectric constants of these reference materials, the field distortions of the detection signal that are generated by the background are deduced with sufficient accuracy.

The dielectric constants of the enclosing medium can be calculated from the reference optimizations of the measured signal carried out for the enclosing medium with the stored parameter model for an enclosing medium. If the dielectric constant of the enclosing medium is known, the inventive method can be used to directly deduce the depth of the enclosed object based on the phase of the signal part that originates from the enclosed object.

Advantageously, the inventive method therefore enables a quantitative indication of the depth at which the hidden object is located. If the phase displacement of the measured signal that originates from the enclosed object is known, and if the dielectric constant of the enclosing medium is also known, the depth information can be obtained therefrom in a direct manner.

In advantageous fashion as well, the mesured signal is measured and evaluated in the inventive method as a function of a lateral displacement of the sensor device that is generating the detection signal. Moving the capacitive sensor device across the enclosing medium enables signal evaluation that is correlated to location. This means that the influence of a hidden object, e.g., an electrical line or a plastic pipe in the wall, is not only observed and measured at a measurement point, it is also tracked over a plurality of points. As a result, objects can be detected and located with a level of certainty and reliability heretofore unattained.

The inventive method evaluates the measured signal at a large number of measuring frequencies, so that clarity problems with the measured signal resulting from redundant frequency measured values can be eliminated, for example.

The inventive method may be used in advantageous fashion in a measuring device, in particulation in a locating device that permits the detection of objects enclosed in walls, ceilings and/or floors, for example. By using high-powered digital signal processors, the corresponding inventive measuring device also makes a user interface possible that includes very simple operation and an unmistakable depiction of the results of the locating procedure. The graphical depiction, in a display of the inventive measuring device, of the permissible drilling depth at every point over which the device is moved provides clear, reliable information without the need for the user to interpret sound or illuminated signals, as is the case with locating device of the related art.

The measuring device according to the invention and/or the inventive method on which it is based enable the operator to determine the exact location of an object enclosed in a medium, in all three dimensions of space. It is also possible with the inventive method to obtain information about the size of the enclosed object.

BRIEF DESCRIPTION OF THE DRAWINGS

An exemplary embodiment of the inventive method is presented in the drawing, and it is explained in greater detail in the description hereinbelow. The figures in the drawing, their description, and the claims directed to the inventive method and/or the measuring device that utilizes the method contain numerous features in combination. One skilled in the art will advantageously consider them individually as well and combine them into reasonable further combinations.

DETAILED DESCRIPTION OF THE PREFERRED EMBODIMENTS

Figure 1:
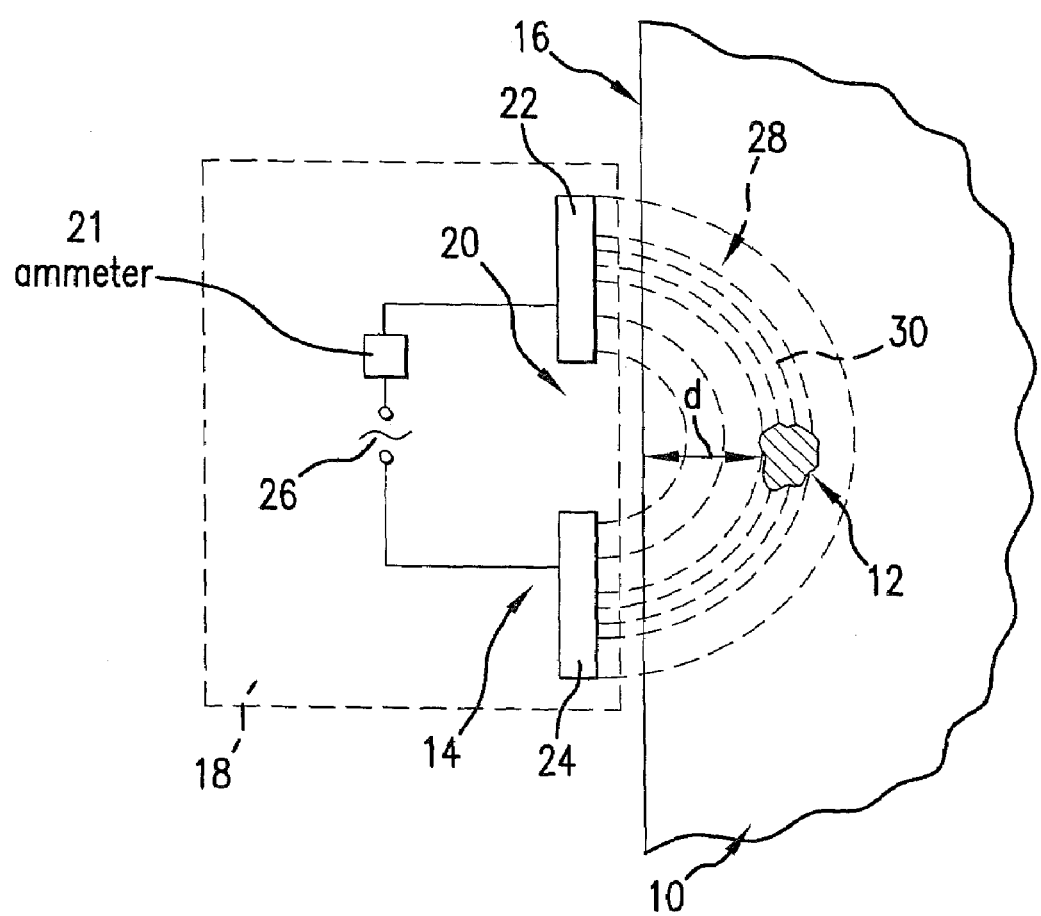
FIG. 1 is a schematic representation of the measurement situation on which the inventive method is based.

FIG. 1 is a schematic representation of a typical measurement situation for application of the inventive method and/or utilization of the measuring device.

The objective is to detect an object 12 that is enclosed in a medium 10 using a capacitive sensor device 14. Enclosed object 12 is located at a distance d from a surface 16 of enclosing medium 10. A measuring device 18, which contains capacitive sensor 14, among other things, is placed on surface 16 of medium 10 that encloses object 12. Capacitive sensor device 14 is essentially composed of a precision capacitor 20, which includes two capacitor electrodes 22 and 24. Capacitor electrodes 22 and 24 are positioned side-by-side in FIG. 1 merely to graphically illustrate the measurement principle. In a real capacitive sensor device, the electrodes of a measurement capacitor will be positioned essentially parallel to each other. The desired directional effect of the electric field of measurement capacitor 20 is generated by corresponding electrodes or geometric means.

By applying an electrical voltage 26, an electric field 28 is generated between electrodes 22 and 24 of measurement capacitor 20 of measuring device 18. If an alternating voltage, in particular, is applied to the two electrodes of the measurement capacitor, a "shift current" flows along flux lines 30 that describe electric field 28. When voltage U is fixed, shift current I is greater the lower the impedance, i.e., complex resistance Z of measurement capacitor 20, is. Shift current I can be measured directly using an ammeter 21, for example, or using a measurement parameter M correlated with the shift current, such as a voltage signal.

Impedance Z of measurement capacitor 20 is essentially determined by the material located between capacitor electrodes 22 and 24. If a measurement capacitor 20 of this type is now brought into the vicinity of an enclosed object 12, the composition of the material changes in the area covered by electric field 28. In particular, the presence of an enclosed object 12 results in a changed dielectric constant E and, therefore, changed impedance Z in comparison with a medium 10 in which an enclosed object 12 is not present.

The change in dielectric constants induced by the presence of enclosed object 12 and the associated change in impedance Z of the measurement capacitor corresponds to changed capacitance C of the measurement capacitor.

The increase in capacitance C of measurement capacitor 20 and/or the resultant increase in shift current I between capacitor electrodes is depicted in FIG. 1 using an increased density of flux lines in the illustration of electric field 28 in the flux line illustration.

When a material having a greater dielectric constant E than the corresponding constants of surrounding medium 10 enters field area 28 generated by capacitive sensor 14, the flux lines become denser. If an object has lower dielectric constants than the surrounding material, the flux line density is reduced in the area of the enclosed object.

The change in capacitance caused by the presence of an enclosed object and/or the change in shift current in the capacitive sensor may be measured and evaluated using various electronic circuits.

For example, the natural frequency of an oscillating circuit that forms can be utilized by the measurement capacitor and at least one coil connected with it in series or in parallel. After excitation by a brief electrical pulse, an oscillating circuit of this type performs a damped oscillation at its resonance frequency. A time-resolved measurement of the resonance therefore enables deductions to be made about the capacitances involved and, therefore, the shift current.

As an alternative, the shift current may be measured directly by the measurement capacitor when a constant alternating voltage having a fixed frequency is applied.

In the inventive method, electrical shift current I of capacitive sensor device 14 is not measured directly. Instead, to evaluate the detection signal, a frequency-dependent measurement parameter M is measured, which has a nearly linear relationship with the shift current of the capacitive sensor device. With the inventive method, an electrical voltage correlated with the shift current, in particular, is measured as measurement parameter M. That is, the following applies for measurement parameter M that is utilized:

$$M = M(\omega) = \alpha(\omega) + \beta(\omega) * I(\omega)$$

Complex measurement parameter M(ω) is evaluated in linear approximation of shift current I(ω) of the measurement capacitor. In this process, α(ω) describes an internal crosstalk of the capacitor electrodes, and β(ω) takes into account the frequency characteristic and phase distortions on the electrical lines inside the evaluation circuitry and the matching network of the capacitive sensor device.

α(ω) and β(ω) are frequency-dependent constants that are capable of being measured independently. They can be determined very exactly by performing a reference measurement of defined impedances, for example, so that, by measuring M, the shift current is also measured.

Figure 2:
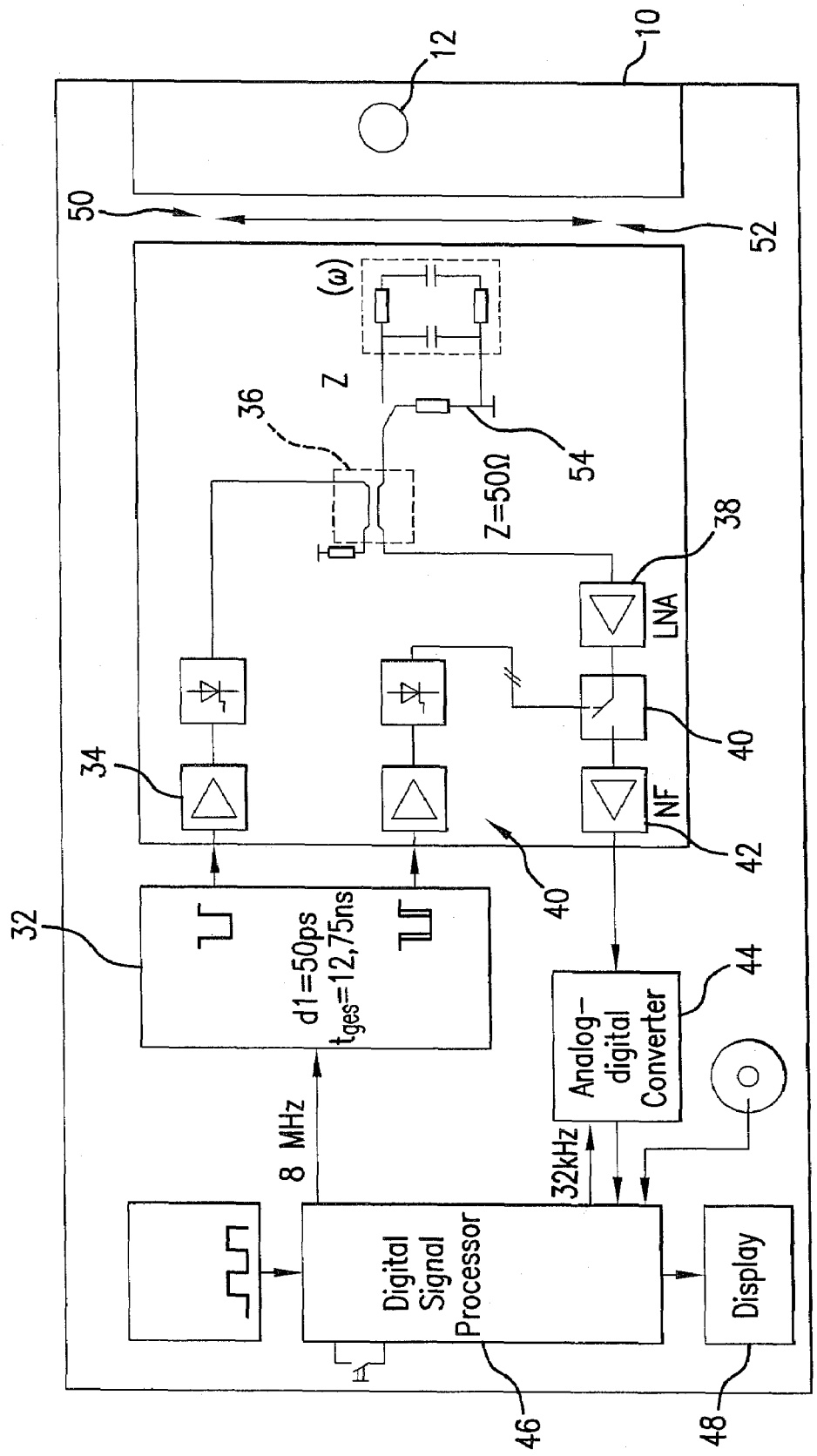
FIG. 2 is a block diagram for measuring impedance according to the inventive method.

FIG. 2 shows an exemplary embodiment of an evaluation circuit that can be utilized within the framework of the inventive method. A pulse generator 34 controlled by a time base 32 generates a chronologically short, spectrally broad voltage pulse that can be supplied to capacitive sensor device 14 via a wave coupler 36. The capacitance of measurement capacitor 20 and, therefore, impedance Z of the sensor are a function of the dielectric medium that penetrates the electric field of the capacitor electrodes.

If the capacitive sensor device is brought into the vicinity of an object 12, distortions of the electric field occur due to the changed dielectric constants of the capacitor field. Impedance Z is changed as a result, and it is capable of being measured via the shift current and/or derived measurement parameter M(ω). The impedance of the capacitive sensor is coupled out once more as a time-dependent voltage signal U(t) by directional coupler 36, then it is amplified and forwarded to a sampling unit 40, in which the magnitude and phase of the measured signal are determined. This will be described in greater detail hereinbelow.

At the point at which measurement sensor 14 is connected to the match-terminated line, voltages coupled in by the generator via wave coupler 36 are reflected in more or less pronounced fashion. The amplitude and phase of the signal reflected at this point is a reflection of the difference of impedance Z of sensor 14 and line impedance; it makes it possible to deduce the magnitude and phase of the impedance of sensor 14 and, therefore to determine the magnitude and phase of the current flow through sensor 14.

The determination of the magnitude and phase of current flow through sensor capacitor 14 can therefore be traced back to the determination of magnitude and phase of voltage U reflected at the connection point of sensor 14.

The signals reflected at the connection point pass back through the wave coupler. The signals induced in the transmitting branch via crosstalk in wave coupler 36 are negligible in comparison with the signal portions passing back directly in the direction of the detecting branch. Voltage V that exists at the entry of the detection circuit is a reflection of voltage U that is reflected at the connection point of sensor 14, except for the minimal losses at wave coupler 36 and the time-of-arrival difference.

The voltage (which is usually low) that results after wave coupler 36 is advantageouly amplified first in a high-frequency amplifier 38 in the detecting branch. The voltage is then sampled at defined points in time T. The points in time at which the voltage is measured is established by a sampling pulse. In order to enable a determination of the phase of the reflected voltage relative to the phase of the voltage produced by the generator, it is important that the generator of the transmit signal and the generator of the sampling pulse be coupled in a phase-locked manner. This is ensured by the use of the time base.

The voltage portions that exist at sampler at frequency f, namely $$V(f) = v(f) * \exp(i\phi(f))$$

therefore correlate with voltage W(T) measured after the sampler according to the equation $$W(T) = Re(\exp(I*2\pi*f*T)*V(f))$$

A shift in the point in time T at which sampling takes place therefore allows the magnitude and phase of voltage V at frequency f to be deduced.

Voltage W is advantageously processed first in a low-frequency amplifier so it can then be detected in an analog-digital converter. By measuring voltage W at various points in time T, it is therefore possible to determine amplitude as well as the phase of the reflected voltage portions and thereby deduce the magnitude and phase of the currents flowing in the sensor.

The measured signal is forwarded to a digital signal processor 46 in addition to analog-digital converter 44.

DSP element 46 performs further signal processing and control of the time base to generate the excitation pulse and the sampling pulse. DSP element 46 makes it possible for the evaluated measured values, i.e., the depth of objects enclosed in the wall, in particular, and their lateral position relative to the measurement sensor, to be depicted in a display in real time, i.e., during the measurement procedure itself. In this manner, it is possible with the inventive method to show the operator in a display where and at what depth in the wall objects are enclosed, even while the device is still being moved across a wall, for instance.

To determine lateral position, the capacitive measuring device can be moved across the medium to be analyzed in two opposite directions 50 and 52. A corresponding path sensor that forwards the current position of the capacitive sensor device to the digital signal processor permits the correct depiction of the depth and lateral position of the object.

For the inventive method, it is provided that, for calibration purposes, a defined reference impedance 54 can be measured instead of measurement capacitor 20. To this end, the electrical circuit for generating and evaluating the detection signal has switching means for generating and evaluating the detection signal, the switching means being depicted in the exemplary embodiment in FIG. 2 as symbolic switch 56. The switching means permit the excitation pulse to be forwarded not to measurement capacitor 20, but to reference impedance 54 instead. This defined reference impedance 54 can be generated, for example, by short-circuiting the signal line. Another possibility for realizing a defined impedance inside the device is via an "open end" of the signal line, for example. In this manner, the inventive method and/or the inventive measuring device have a calibration device that is contained in the method and/or the device, which enables the method to compensate for thermal drifts using mathematical means, for example.

It is therefore possible, in particular, by performing the calibration measurement at defined impedance 54, to determine constants $\alpha(\omega)$ and $\beta(\omega)$, which are influenced by the electrical network and establish the correlation between electrical shift current I of the capacitive sensor device and measured parameter $M(\omega)$, and to compensate for drifts of measured signal $M(\omega)$ that occur relative to shift current $I(\omega)$ after a reference measurement of this type is carried out.

Substantial drift effects result primarily from temperature changes and aging processes in the components involved. For example, additional time delays $\delta T$ can also occur between the excitation pulse and the interrogation pulse, which would result in distortions in the low-frequency signal. Since an additional time delay of this nature only results in a multiplicative factor in the case of the Fourier-transformed measurement signal $M(\omega)$, a drift of the sampling point in time of this nature may be canceled in the data record relatively easily.

Moreover, the pulse power and spectral shape of the excitation pulse in particular can be subjected to thermal drift. A drift in the frequency characteristic of the high-frequency amplifier may also be compensated for using a reference measurement of this nature.

Figure 3:
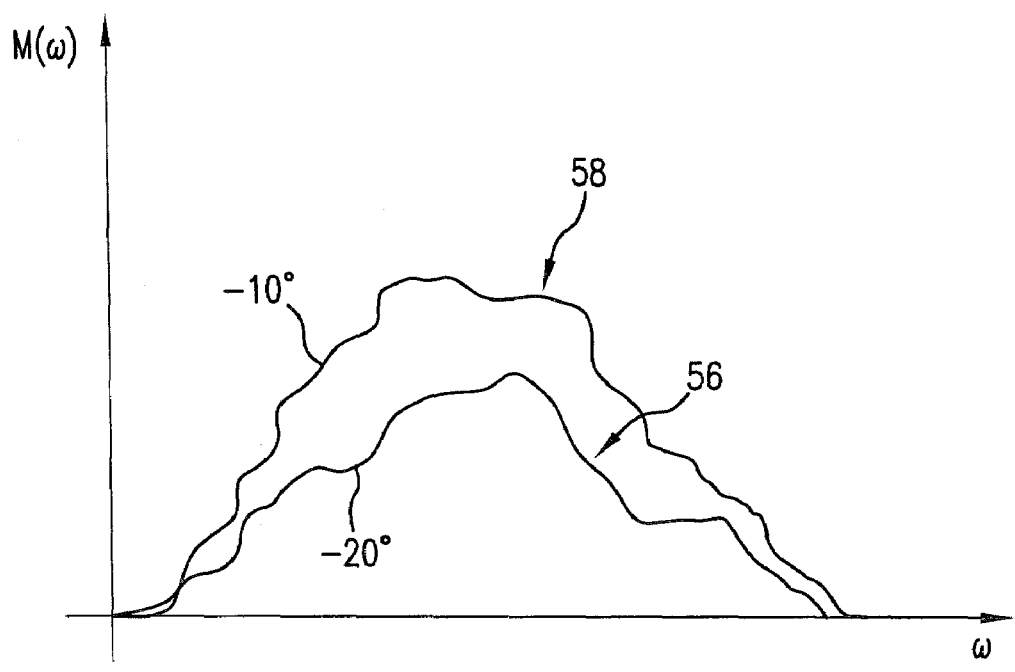
FIG. 3 is a symbolic representation of the temperature dependance of the evaluated measured signal M(ω)

To compensate for changes in the device, e.g., temperature-induced drifts, a linear correction function for the measured signal is used. FIG. 3 is a schematic representation of the temperature influence on measurement parameter $M(\omega)$. Measurement parameter $M(\omega)$ is subject to strong temperature-dependent change. Curve 56, for instance, shows the frequency-dependent measurement parameter $M(\omega)$ at a temperature of 20° C. Measurement curve 58, which is also shown, depicts signal $M(\omega)$ measured at a temperature of −100° C. The method used to evaluate the measured signal now assumes that there is a linear dependence between the two measurement curves at different temperatures.

To compensate for this temperature effect, two correction factors $\gamma 0(\omega)$ and $\gamma 1(\omega)$ [are used to establish] the correlation of measurement parameter $M(\omega)$ measured under calibration conditions (e.g., 20° C.) with measurement parameter $M(\omega)$ obtained in an on-site measurement. That is, the following applies, for example:

$$M^{-10°}(\omega) = \gamma 0(\omega) * (M^{20°}(\omega)) + \gamma 1(\omega)$$

For the inventive method, for example, measurement parameter $M(\omega)$ is measured under calibration conditions, i.e., at a defined temperature and reference impedance, which can be realized via air measurement, a calibration stone or a short-circuited sensor.

If a calibration measurement is now carried out on-site under real operating conditions with the same defined impedance, i.e., an air measurement, a measurement of a calibration stone, or a measurement with a short-circuited sensor, correction constants $\gamma 0(\omega)$ and $\gamma 1(\omega)$ can now be deduced from measured value $M(\omega)$, which has been changed due to drift effects. The correction factors determined in this manner are stored in a memory unit, so they can be called up for subsequent signal evaluation.

If a calibration having defined impedance is carried out before the actual measurement to locate an enclosed object, correction factors $\gamma 0(\omega)$ and $\gamma 1(\omega)$ that are currently obtained in the calibration measurement are also used to correct measurement parameter $M(\omega)$ in the actual measurement procedure.

In this manner, the inventive method is capable of canceling effects in the measured signal that have an adulterating influence on the measurement parameter to be processed. These influences on the measurement parameter of the capacitive sensor device, referred to in general as drift effects, include, in particular, temperature changes, changes in humidity, changes caused by component aging, and changes caused by a variation in the voltage supplied to the measuring device. The exemplary embodiment of an inventive measuring device in the form of a hand-held, battery-operated measuring device can therefore compensate for a drop in battery voltage even over a certain period of time without this variation in voltage having a marked influence on the quality of the measured results.

In addition to the drift effects described, sample strews of individual components also result in different measurement characteristics of each individual measuring device, which can be compensated for using the correction function described. The inventive method therefore enables compensation for drift effects or sample strews by comparing a reference signal stored in the device with a calibration signal recorded at the point in time when the measurement is performed. This comparison measurement allows a linear correction parameter for the measured signal to be determined, which permits the inventive method to back-calculate the values measured currently on-site to reference conditions.

It is advantageous, in particular, to carry out a reference measurement directly after a device is fabricated, e.g., still in the factory, under defined calibration conditions. This measurement can then be adjusted later based on the actual location measurements carried out on-site.

It is also possible to carry out a reference measurement of this type that yields a defined measured signal $M(\omega)$ by using a "master measuring device", and to import the reference values determined for the "master device" in the form of a performance map into further measuring devices immediately after production. In this case, it would also be possible, for example, to compensate for sample strews of the directional pattern of the electric field of the precision capacitor of the individual devices.

Different directional patterns resulting from mechanical and geometric differences in capacitor electrodes and/or corresponding directional electrodes for the electrical measurement field mean there are differences in terms of the detected location of an enclosed object, and they make it difficult to compare the measured data obtained with the various devices.

Figure 4:
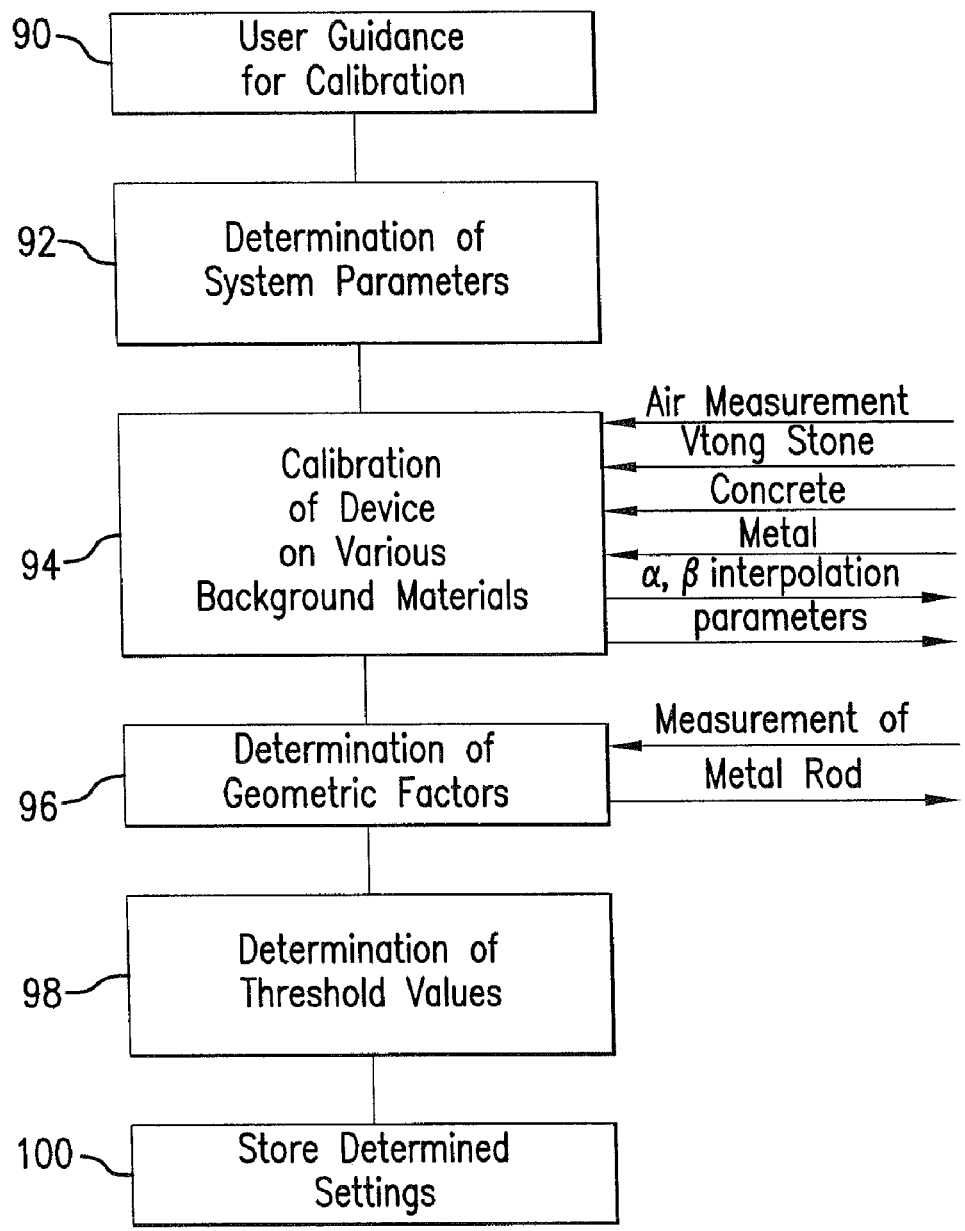
FIG. 4 is a block diagram for depicting method steps for recording reference values.

FIG. 4 uses a block diagram to illustrate the process of measuring reference values, which are measured in the factory directly after the inventive device was produced, for example, and which can be stored in a memory element of the measuring device. In step 90, user guidance is written to a memory element of the inventive measuring device, which is capable of being reproduced on a display of the measuring device as an animated film sequence, and thereby better inform the operator about the method steps to carry out to calibrate the measuring device on-site.

In method step 92, reference measurements are carried out and stored in the device. The reference measurements serve to determine the system parameters specific to the device. To this end, the signal measured at defined impedances is evaluated, and a linear order correction function is created for each individual measuring device. Using this correction function, it is possible to cancel sample strews, e.g., of the mechanical design of the capacitive sensor device, out of the signal measured later on-site.

In method step 92, the measuring device is calibrated against various defined background materials. The values of these reference measurements, e.g., carried out on air, concrete, metal and Ytong stone, and further commonly used building materials, are stored in the device. By referencing the known dielectric constants of these defined materials, constants $\alpha(\omega)$ and $\beta(\omega)$ may be determined; these constants are conditional upon the detection network and represent the relationship between the dielectric shift current of the capacitive sensor device and measured signal $M(\omega)$ used for evaluation purposes. A reference measurement of this type also makes it possible to determine the signal distortions that occur due to phase distortions and the frequency characteristic of signal lines, and/or internal crosstalk between the electrodes of the precision capacitor. In this manner it is possible to very accurately deduce the fundamental dielectric shift current when performing a subsequent determination of the measured signal $M(\omega)$ on-site by using coefficients $\alpha(\omega)$ and $\beta(\omega)$, which are then known.

In method step 92, interpolation parameters are also obtained for the model of the enclosing medium on which the method is based. The inventive method uses a numeric model for the enclosing medium, which utilizes a plurality of material parameters of defined reference materials. By performing a reference optimization between the signal, measured on-site, from the surrounding medium with the parameters of the model stored in the measuring device, it is possible to very exactly determine the dielectric properties of the surrounding medium that was measured. Essentially, an interpolation of the reference parameters on which the model is based is utilized on the value of the enclosing medium that is measured on-site.

In method step 96, a determination of a geometric factor of the capacitive sensor device is carried out. To this end, a reference signal is measured on a defined, spatially very limited reference body that is enclosed in a known medium. Due to mechanical or geometric deviations of the electrodes of the capacitive sensor device, differences can occur in the directional pattern of the precision capacitor, which would result in uncertainty about the exact determination of the location of the enclosed object. In method step 96, correction parameters are therefore determined to take into account the deviations in the directional patterns of individual measuring devices for every individual measuring device, and they are stored in the measuring devices, so that the evaluating algorithm can call up these parameters and take them into consideration.

In method step 98 in FIG. 4, the factory setting of reference values for the inventive method and/or the inventive measuring device determines threshold values for object detection based on the reference measurements that are carried out. Using these threshold values, the processing algorithm determines whether an object has been detected or not. The threshold values are a function of the measurement accuracy of every individual device, and of corresponding sample strews.

Method step 100 in FIG. 4 represents the storage of predetermined settings in a memory element of the inventive measuring device. Using the stored reference values and a calibration measurement to be carried out on-site before the actual measurement, it is possible to largely eliminate interference effects on the measured signal, enabling an extremely accurate measurement sensor to be obtained. It should be emphasized, in particular, that plastic pipes can be detected using this measurement sensor as well, for example. Including a large number of reference values that permit inteference effects to be canceled during subsequent evaluation of the signal has a substantial effect on the enhanced performance of the inventive measuring device and/or the inventive method on which it is based.

A central point of the inventive method is to divide measured signal $M(\omega)$ to be evaluated into two parts. Measured signal $M(\omega)$ is divided into a background part $UG(\omega)$, which originates from the enclosing medium, and an "enclosed" part $E(\omega)$, which results from the enclosed object.

The phase and amplitude of the "enclosed" signal and the background signal are known from the measurement of signal variable $M(\omega)$. It must be noted that "enclosed" signal $E(\omega)$, which originates from enclosed dielectric objects, is extremely small. Changes in capacitance, which are determined when an enclosed object is present, typically take place in the sub-picofarad range when enclosed dielectric objects, such as plastic pipes, are present. When an alternating voltage of, e.g., one volt, and having a measuring frequency of 100 KHz, is applied to the capacitive sensor, the small changes therefore result in differences in the shift current of less than one microampere.

For this reason, a measuring frequency in the gigahertz range is utilized with the inventive method in order to generate changes in the measured signal that are sufficiently great, even when the smallest changes in capacitance take place due to the presence of an enclosed object. The background signal is the signal that would be generated if objects were not present. It can be measured directly next to an enclosed object, for example. The present invention takes advantage of the fact that the background signal is dominated by parts of the shift current that are generated by the areas of the electrical measurement field that are close to the surface. From this point forward it is assumed that background signal $UG(\omega)$ is known. Background signal $UG(\omega)$ is composed of shift currents $lv(\omega)$ along flux lines v of the electric field of the precision capacitor. As shown in FIG. 1, for example, the individual flux lines v are of different lengths. It is therefore possible to define a mean flux line length L, which indicates the phase of the shift current. From this point forward, all phases are indicated in relation to this mean phase. If an enclosed dielectric object is brought into the vicinity of the measuring electrodes of the capacitive sensor device, the current distribution of the shift current changes. In practice, one can assume that this change, which is caused by an enclosed object, is small. The following therefore applies:

$$E(\omega) \ll UG(\omega).$$

It can therefore be approximately assumed that the influence of the dielectric field results in an amplification or attenuation of shift current lv v along individual flux lines v having length Lv. The following therefore applies:

$$Iv(\omega)(\text{in the presence of an enclosed object}) = \xi * Iv(\omega)(\text{background}) * \exp(i*2\pi/\lambda(\omega)*(Lv-L))$$

In this case, $\xi$ represents a real amplification or attenuation factor. If the dielectric constant $\epsilon$ of the enclosed object is greater than the $\epsilon$ of the surrounding medium, then $\xi > 1$. The capacitance of the precision capacitor is increased, and the shift current is increased. In the opposite case, $\xi < 1$. If the enclosed object is small enough, so that only flux lines having a certain length Lv are affected, then the following approximately applies:

$$E(\omega) = Iv(\omega)(\text{in the presence of an enclosed object}) - Iv(\omega)(\text{background})) = (1-\xi) \exp(i*2\pi/\lambda(\omega)*(Lv-L))*Iv(\omega)(\text{background})$$

If the type of enclosed object is known, e.g., a metallic enclosed object or an open space, then the sign of $(I-\xi)$ is known.

The following therefore applies:

$$2\pi/\lambda(\omega)*(Lv-L) = -\phi(\omega) + \psi(\omega)$$

That is, the length of the affected flux lines Lv may be deduced based on a comparison of the phase of the signal $E(\omega)$ with the phase of the background signal $UG(\omega)$, based on the relationship:

$$\lambda(\omega)/2\pi*(-\phi(\omega)+\psi(\omega))+L=Lv$$

The length of the affected flux lines is related to the depth of the object via a geometric factor $G(\omega,L)$.

In practice, the device performs averaging over a location interval [x,y] in which largely no enclosed objects are present. The spacial mean of $MW\_M(\omega)$ therefore provides a usable starting point for the background components. This means that, if the measurement parameter $M(Xj,\omega)$ was detected at n locations Xj, then, to determine the background components, all j greater than $M(Xj,\omega)$ are summed and normalized with 1/N.

As a possible extension of this fundamental averaging method, it is advantageous to exclude areas with strong signal changes, i.e., large deviations from the mean, from the averaging, or to replace the calculation of the mean with the determination of the median of the measured data obtained over the location.

Instead of performing an averaging of various locations, it is also possible to utilize background signals $MUG(\omega)$ stored in a table in the memory. If it is known that the background is concrete, for example, it is possible to utilize measured values $MUGBETon(\omega)$ that are obtained for a homogeneous concrete block and are stored in the memory as the background signal. The stored background signal to be subtracted can be selected automatically, e.g., by comparing an estimated background signal with various backgrounds stored in a table, or via a switch that the user can operate.

A numerical model is used for the background, the model utilizing at least four material parameters, e.g., the dielectric constants of known materials. The model is based on the reflectance behavior of electromagnetic signals on dielectric boundary layers. To determine the material of the enclosing medium that is measured, the weighting of the parameters in the model of the enclosing medium is varied until a model signal that comes as close to it as possible can be reconstructed by performing a reference optimization in the measured background signal. The dielectric constants of the measured enclosing medium can therefore be deduced based on an interpolation of the parameters of the model medium. When the dielectric constants of the enclosing medium are known, the depth of the enclosed object in the enclosing medium may be deduced from the phase information of the measured signal that originates from the enclosed object.

According to the invention, it is provided with the method described that the threshold for detecting enclosed objects is variable. A sensitivity setting allows, e.g., irrelevant objects, in particular those having a periodic structure, to be canceled out of the measured signal, so they do not appear when the measured results are subsequently displayed on an optical display. The inventive method permits the measuring range to be limited to a desired depth range based on a selected special range of phase displacements of the measured signal. In this manner, the selection of a special, limited depth range may be implemented. The measuring depth displayed in the optical display of the inventive measuring device may be switched between various values (e.g., 6 and 10 cm).

Figure 5:
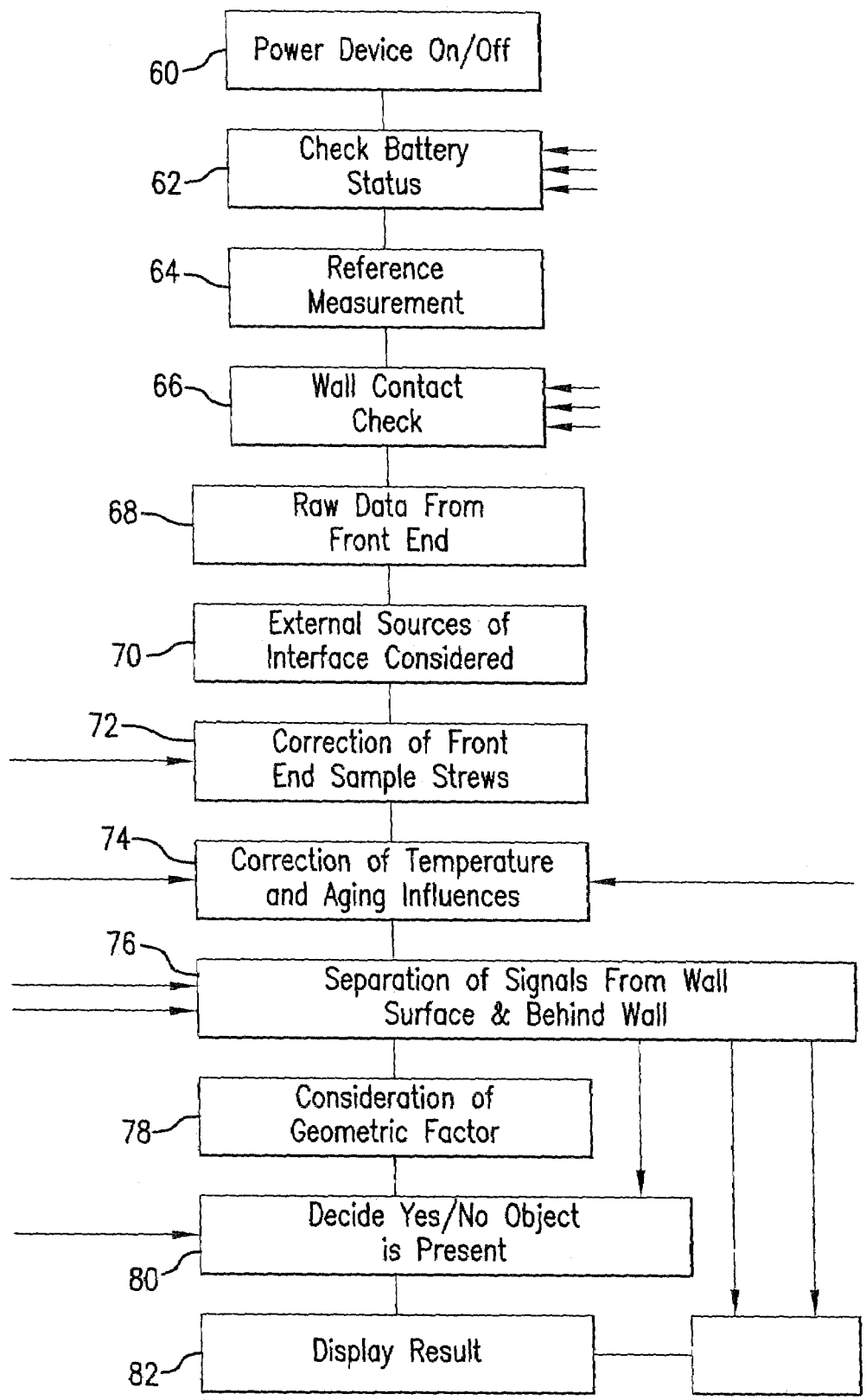
FIG. 5 is a block diagram for depicting the method steps in the inventive method.

FIG. 5 is an overview of a block diagram to illustrate the individual method steps in the inventive method.

After the device is powered on in step 60, a system query for the measuring device takes place. System query 62 checks the battery status (battery voltage), for example, the internal resistance of the battery, and the current temperature. In step 64, a reference measurement at a defined impedance is carried out. To this end, a reference device inside the device can be utilized, for example, or an air measurement can be carried out. This reference measurement is also carried out to determine EMC interferences, e.g., caused by adjacent transmitting equipment. EMC interferences of this nature may be subsequently canceled in the measured signal with the inventive method.

A wall contact check takes place in step 65 of the inventive method, in which the corresponding displacement transducer of the inventive measuring device performs a query to ensure that the measuring device is placed properly on the wall to be analyzed. As an alternative, the wall contact can also be queried by evaluating the measured signal of the capacitive sensor device. If the measuring device determines that the surrounding medium is air, then the device cannot be placed on the wall.

The actual measuring procedure then takes place in method step 68, in which raw data from the capacitive sensor device is measured and forwarded to the digital signal processor. In method step 70, which represents the start of the evaluation of the measured signal, interference signals from external sources of interference are canceled out of the raw data. In method step 72, a first correction of the measured signal due to sample strews takes place. To accomplish this, the device-specific system parameters determined by a reference measurement performed in the factory, i.e., the corresponding correction coefficients, are taken into account and the measured signal is transformed in a described, linear fashion. Method step 74 describes the correction of drift effects internal to the device, such as temperature and aging influences. To determine a corresponding correction function for measured signal M(ω), a comparison is carried out in method step 74 between a reference measurement of a defined impedance carried out in the factory and stored in the device, and the result of the actual reference measurement according to method step 64. For measured signal M*(ω) that has been processed in this manner, the described separation into signal parts arising from the enclosing medium and signal parts that originate from the enclosed object is now carried out in method step 76. The measured wall material is determined via interpolation with the reference values using the parameters stored in the device for reference materials and a corresponding mathematical model for the composition of the enclosing medium. In particular, a dielectric constant is assigned to the measured wall material and/or the enclosing medium, which is required for the further evaluation of the measured signal.

After the detection signal is separated into signal parts originating from an enclosing medium and/or an enclosed object, a geometric factor for the capacitive sensor device is taken into account in method step 78 to determine the exact location position of the enclosed object. This geometric factor takes into account production-induced geometric deviations in the directional pattern of the capacitive sensor device, for example. These device-specific differences can be taken into account using a linear correction function and canceled out of the actual measured signal. In order to take into account the threshold values for object detection set at the factory, the decision is made via signal processing in method step 80 whether an object has been located or not. If the decision is positive, the size of the object, its length relative to the measuring device, and the depth of the object are then determined via the described evaluation of the magnitude and phase of the measurement parameter M*(ω). In particular, the depth of the enclosed object in the wall is determined from the phase of the measurement parameter M*(ω) and the dielectric constant of the round material determined in method step 76.

In method step 82, the measured result that is obtained is displayed graphically on the display of the measuring device. To accomplish this, the position of the located object relative to the current position of the measuring device, the object size and the depth of the object are depicted on the display device of the measuring device using symbols in such a manner that the operator is provided with a cross-sectional representation of the analyzed wall.

In particular, it is also possible to display, graphically as well, for example, a permissible drilling depth that is possible without contacting the located object during drilling. The depiction of the measured results on the display of the measuring device takes place in real time, so that the located object is depicted on the display of the inventive measuring device with a minum time delay, even while the measuring device is still being moved across a section of the wall.

The inventive method and the corresponding inventive measuring device are not limited to the exemplary embodiment presented in the description and the drawing.

Reference Numerals in FIGS. 4 and 5

90 User guidance for calibration
92 Determination of system parameters based on a reference measurement, calculation of coefficients to cancel sample strews
94 Calibration of the device on various background materials, input signals: measurement of air, Ytong stone, concrete, metal; output parameters: α, β, interpolation parameters
96 Determination of the geometric factors of the sensor; input parameters: measurement of a metal rod in concrete
98 Determine the threshold values for object detection
100 Store the determined settings in the memory
60 Power the device on or off
62 Check the battery status; input parameters: temperature, battery voltage, internal resistance
64 Reference measurement, measurement of EMC interferences -continued 66  Wall contact check; input parameters: displacement transducer 1, displacement transducer 2, measured data
68  Raw data from front end
70  External sources of interference taken into account
72  Correction of front end sample strews; input signal: system parameters
74  Correction of temperature and aging influences; input parameters: reference measurement in the factory, new reference measurement
76  Separation of signals from wall surface and signals from objects behind the wall, determination of the wall material; input parameters: parameters, interpolation vectors; output parameters: wall material, user guidance
78  Take into account the geometric factor of the sensor
80  Decide yes/no object is present, determine the size and depth of the object; input parameters: thresholds, wall material
82  Display the result, input parameter: limitation of the display depth

We claim:

1. A method for locating objects enclosed in a medium, comprising the step of generating a detection signal by at least one capacitive sensor device, penetrating by the detection signal the medium that is to be analyzed in such a way that information is obtained about the objects that are enclosed in the medium, obtaining the information about the objects that are enclosed in the medium by evaluating the detection signal, particularly by measuring impedance so that a value and a phase of a complex resistance are measured, performing the evaluating of the detection signal by using an algorithm that separates the measured signal into signal parts originating from the enclosing medium and signal parts originating from the object enclosed in the medium, determining a location of the object that is located in the medium based on the signal parts originating from the enclosing medium and on the signal parts originating from the object, and making information about the determined location of the object enclosed in the medium available to a user.

2. The method as recited in claim 1, further comprising to determine the part of the signal that originates from the enclosing medium, using a model that has n parameters for the material of the enclosing medium.

3. The method as recited in claim 2, wherein the n parameters of the model for the enclosing medium are stored in the form of a program map and are capable of being queried by an evaluation algorithm for evaluation of the measured signal.

4. The method as recited in claim 3, further comprising obtaining the parameters of the program map by performing n reference measurements at defined impedances.

5. The method as recited in claim 4, further comprising carrying out at least one reference measurement on a known reference material.

6. A method for locating objects enclosed in a medium, comprising the steps of generating a detection signal by at least one capacitive sensor device, penetrating by the detection signal the medium that is to be analyzed in such a way that information is obtained about the objects that are enclosed in the medium, obtaining the information about the objects that are enclosed in the medium by evaluating the detection signal, particularly by measuring impedance so that a value and a phase of a complex resistance are measured, performing the evaluating of the detection signal, by using an algorithm that separates the measured signal into signal parts originating from the enclosing medium and signal parts originating from the object enclosed in the medium, and a location of the object is determined based on the signal parts originating from the object, and determining the part of the signal that originates from the enclosing medium by using a model that has n parameters for the material of the enclosing medium, obtaining the parameters of a program map by performing n reference measurements at defined impedances, obtaining at least one reference measurement by short-circuiting the detection signal, determining a location of the object that is enclosed in the medium based on the signal parts originating from the enclosing medium and on the signal parts originating from the object, and making information about the determined location of the object enclosed in the medium available to a user.

7. The method as recited in claim 2, further comprising to determine the material of the enclosing medium, carrying out an interpolation of a material value that is measured for the enclosing medium with the n parameter values of the model, and approximately determining the material of the enclosing medium is using a reference optimization.

8. The method as recited in claim 7, further comprising determining a value for the dielectric constants of the material forming the enclosing medium from the interpolation of a material value that is measured for the enclosing medium with the n parameter values of the model.

9. The method as recited in claim 8, further comprising obtaining depth information about the object enclosed in the medium by using the dielectric constants of the material of the enclosing medium that were determined.

10. The method as recited in claim 9, further comprising obtaining the depth information about the enclosed object using the dielectric constants of the enclosing medium from a phase measurement of that part of the measured signal that originates from the object enclosed in the medium.

11. The method as recited in claim 1, further comprising measuring and evaluating the signal as a function of a lateral displacement of the sensor device that is generating the detection signal.

12. The method as recited in claim 1, further comprising measuring and evaluating the signal as a function of more than one measuring frequency.

13. A measuring device, in particular a hand-held locating device for locating objects enclosed in a medium, having a sensor device, with means for generating a detection signal for the sensor device, a control and evaluation unit for determining measured values from the detection signal, and an output device for the determined measuring devices, for carrying out a method according to claim 1.

14. The measuring device as recited in claim 13, wherein the measuring device includes at least one internal calibration device for a measured signal.

15. The measuring device as recited in claim 14, wherein the calibration device enables measurement of at least one defined impedance.

16. A measuring device, in particular a hand-held locating device for locating objects enclosed in a medium, having a sensor device, with means for generating a detection signal for the sensor device, a control and evaluation unit for determining measured values from the detection signal, and an output device for the determined measuring devices, for carrying out a method for locating objects enclosed in a medium, according to which a detection signal is generated by at least one capacitive sensor device, the detection signal penetrating the medium that is to be analyzed in such a way that information is obtained about the objects that are enclosed in the medium by evaluating the detection signal, particularly by measuring impedance so that a value and a phase of a complex resistance are measured, wherein, to evaluate the detection signal, an algorithm is used that separates the measured signal into signal parts originating from the enclosing medium and signal parts originating from the object enclosed in the medium, and a location of the object is determined based on the signal parts originating from the object wherein the measuring device includes at least one internal calibration device for a measured signal, wherein the calibration device includes a short-circuit switch for generating a defined impedance.

17. The measuring device as recited in claim 14, wherein the measuring device includes switching means for temporary activation of the calibration device.

18. The measuring device as recited in claim 13, wherein the measuring device includes means for saving material data, in particular dielectric constants, of known materials.

19. The measuring device as recited in claim 13, wherein the measuring device includes means that permit calculated measured results, in particular the position and/or depth of an object enclosed in a medium, to be depicted in a spatially-resolved manner on a display device of the measuring device.

20. A method for locating objects enclosed in a medium, according to which a detection signal is generated by at least one capacitive sensor device, the detection signal penetrating the medium that is to be analyzed in such a way that information is obtained about the objects that are enclosed in the medium by evaluating the detection signal, particularly by measuring impedance, wherein a measuring signal as a function of a lateral displacement of the capacitive_sensor device correlated to location and generating the detection signal is measured and evaluated, wherein, to evaluate the detection signal, an algorithm is used that separates the measured signal into signal parts originating from the enclosing medium and signal parts originating from the object enclosed in the medium, and wherein a path sensor forwards a current position of the capacitive sensor device to a digital signal processor for depiction of a depth and a lateral position of the object.

21. A method as defined in claim 20; and further comprising displaying graphically a measured result on a display by displaying a position of the located object relative to the current position so that a size of the object and a depth of the object are depicted on the display using symbols in such a manner that an operator is provided with a cross-sectional representation of the medium, said displaying of the measured results on the display taking place in a real time, so that the located object is depicted on the display with a minimum time delay while the sensor device is still being displaced.

22. A measuring device, in particular a hand-held locating device for locating objects enclosed in a medium, having a sensor device, with means for generating a detection signal for the sensor device, a control and evaluation unit for determining measured values from the detection signal, and an output device for the determined measuring devices, for carrying out a method according to claim 20.

23. A method as recited in claim 1, wherein said making information available includes displaying the information about the determined location of the object enclosed in the medium on a display.

24. A method as recited in claim 6, wherein said making information available includes displaying the information about the determined location of the object enclosed in the medium on a display.

* * * * *